United States Patent Office

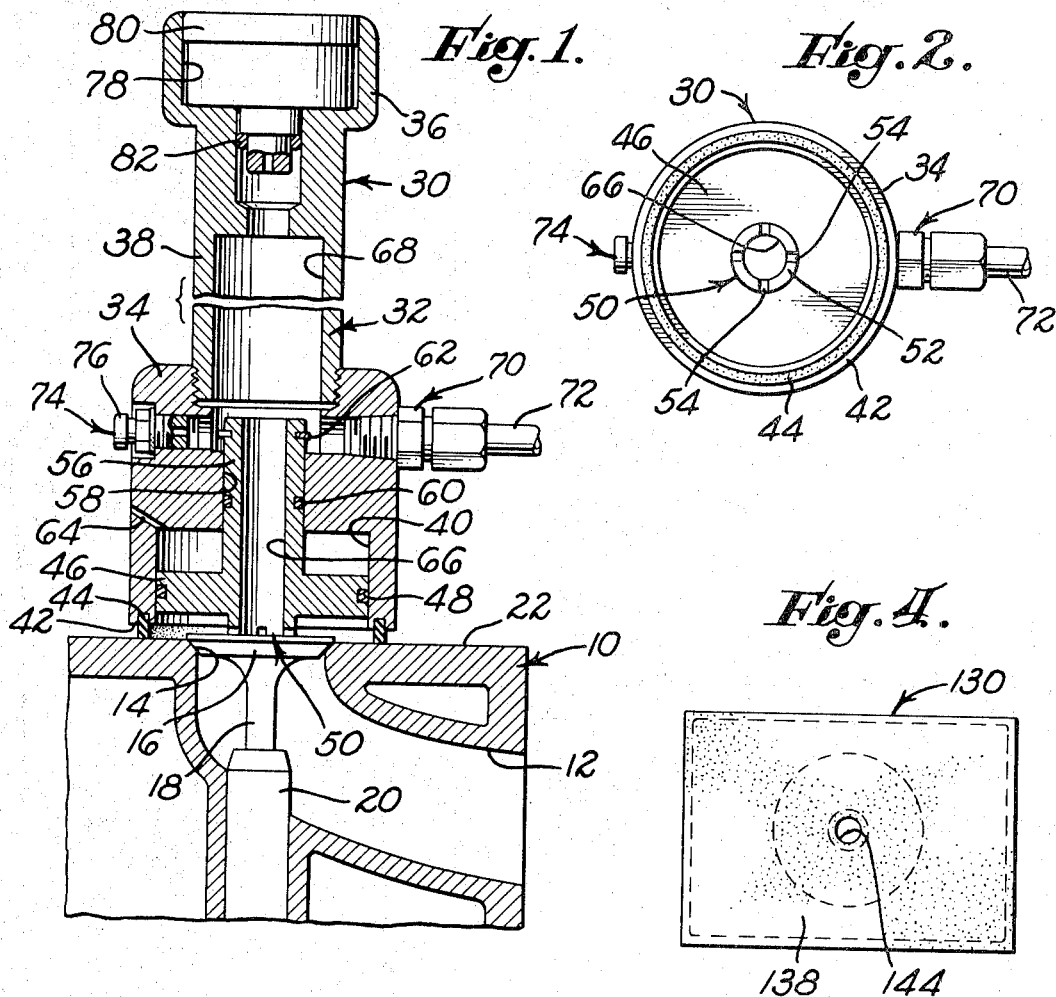

3,563,084
Patented Feb. 16, 1971

3,563,084
VACUUM VALVE TESTING DEVICE
Gene P. Shaffer, 5139 Hazeltine Ave.,
Sherman Oaks, Calif. 91403
Filed Mar. 3, 1969, Ser. No. 803,883
Int. Cl. G01m 3/28
U.S. Cl. 73—47                                    2 Claims

ABSTRACT OF THE DISCLOSURE

A device for vacuum testing the seal between the head of an intake or exhaust valve of an internal combustion engine, and its seat. The device applies a vacuum to one side of the head of the valve to test the seal between the head and the seat, the magnitude of the vacuum attainable being measured to provide an indication of the quality of the seal. This same vacuum is used to seat the head of the valve and to hold the device in engagement with an appropriate part of the engine. Thus, it is not necessary to completely install the valve, as in the case of a device requiring the presence of the valve spring to hold the head of the valve on its seat. Also, it is not necessary to provide any separate means for holding the testing device in place.

BACKGROUND OF THE INVENTION

The present invention relates in general to a device for vacuum testing the seal between the head of a poppet valve and its seat in a structure carrying the valve and, more particularly, to a device for vacuum testing the seal between the head of an intake or exhaust valve of an internal combustion engine, and its seat.

After grinding the intake and exhaust valves of an internal combustion engine, and their seats, it is advisable to determine whether the valves contact the seats properly. Vacuum testing of the seals between the valves and their seats is a convenient procedure which eliminates the lapping operations or bluing tests frequently used to make certain that the valves seat properly.

There is a vacuum test in use which requires complete installation of the valve to be tested so that the valve spring is available to hold the valve on its seat. This conventional vacuum test results in a great deal of wasted labor if it found that the valve leaks excessively, since it is then necessary to remove the valve spring, and associated parts, in order to regrind the valve and its seat and/or to replace the valve, if defective.

SUMMARY AND OBJECTS OF INVENTION

With the foregoing as background, the basic object of the invention is to provide a vacuum valve testing device by means of which the valve may be vacuum tested in place without any necessity for installing the valve spring and associated parts. Consequently, if it is found that the valve does not seat properly, it is not necessary to remove the valve spring, and associated parts, in order to permit regrinding of the valve and its seat and/or replacement of the valve, which is an important feature.

More particularly, a primary object of the invention is to provide a vacuum valve testing device which includes means for applying a vacuum to one side of the head of the valve to test the seal between the valve and its seat, and which utilizes this same vacuum both to seat the valve and to seat the device itself, means being provided to measure the vacuum. With this construction, since the vacuum applied for testing purposes also performs the functions of seating the valve and the device itself, the test may be performed very quickly and easily, which is an important feature.

Another and important object of the invention is to vacuum test a valve in the foregoing manner from either the outer side of the head thereof, or from the stem side of the head.

A specific object in connection with one embodiment of the invention is to provide a device, for use with an engine having an exposed flat surface around the valve seat and the head of the valve, including: a housing provided with a bore having an open end encircled by a rim of a diameter to encircle the seat and the head of the valve; an annular seal carried by the rim and engageable with the flat surface around the seat and the head of the valve; a piston in the bore and having on its outer end central valve-seating means engageable with the head of the valve to hold same on the seat; means for developing a vacuum in the open end of the bore adjacent the outer end of the piston when the annular seal on the rim is seated on the flat surface around the head of the valve and the seat; and means for measuring the vacuum. With the foregoing construction, the vacuum thus developed tests the seal between the head of the valve and the seat, holds the device in engagement with the flat surface around the seat, and acts on the piston to cause the valve-seating means thereon to hold the valve on its seat, all of which constitutes an important feature of the invention.

Another specific object in connection with another embodiment of the invention is to provide a vacuum valve testing device which includes: a housing having a vacuum passage extending through one surface thereof; seal means on such surface and surrounding the vacuum passage and engageable with the periphery of an intake or exhaust port of an engine; and means for measuring a vacuum developed in the vacuum passage when the seal means is in engagement with the periphery of the port and when the head of the corresponding valve is in engagement with its seat. With this construction, a vacuum is applied to the stem side of the head of the valve to test the seal between the valve and its seat, to seat the valve, and to hold the device itself in place.

Another object of the invention is to provide a vacuum valve testing device wherein the vacuum measuring means includes a vacuum gage disposed in a cavity in the housing of the device in communication with a vacuum passage in the housing, coupled with sealing means between the vacuum gage and the housing.

The foregoing objects, advantages, features and results of the present invention, together with various other objects, advantages, features and results thereof which will be evident to those skilled in the vacuum valve testing art in the light of this disclosure, may be achieved with the exemplary embodiments of the invention described in detail hereinafter and illustrated in the accompanying drawing.

DESCRIPTION OF DRAWING

In the drawing:
FIG. 1 is a sectional view showing one embodiment of the invention in use;
FIG. 2 is an end view of the lower end of the embodiment of FIG. 1;
FIG. 3 is a sectional view of another embodiment of the invention in use; and
FIG. 4 is an end view of the left end of the embodiment of FIG. 3 of the drawing.

Description of testing device 30, FIGS. 1 and 2

Referring to FIGS. 1 and 2 of the drawing, illustrated therein is an engine block or head 10 having an intake or exhaust port 12 and a corresponding valve seat 14. Seated on the latter is the head of a poppet-type intake or exhaust valve 16, the stem 18 of which is reciprocable in the usual guide 20. The particular engine block or head 10 shown is of the type having a relatively large exposed flat surface 22 surrrounding the valve seat 14 and the head of the valve 16.

The numeral 30 designates generally a vacuum valve testing device of the invention which, as will become apparent, is capable of testing the seal between the valve seat 14 and the valve 16 without any necessity for completely installing the valve. In other words, it is not necessary to install the valve spring, and associated parts, to have the valve spring available to seat the valve 16. (The valve spring, and associated parts, are omitted from the drawing since it is not necessary to illustrate them.) Thus, in using the testing device 30, it is merely necessary to insert the stem 18 into the guide 20 nutil the valve 16 engages its seat 14.

The testing device 30 includes a housing 32 which is preferably generally cylindrical with enlarged lower and upper ends 34 and 36 joined by an elongated handle 38, it being understood that the terms "lower" and "upper" are only with reference to the particular position shown for the block or head 10. The particular configuration illustrated for the housing 32 makes it easy to hold the device 30 in one hand.

The lower end 34 of the housing 32 is provided with an axial bore 40 having an open lower end encircled by a rim 42 of a diameter to encompass the valve seat 14 and the head of the valve 16. An annular seal 44 carried in a groove in the rim 42 is engageable with the flat surface 22 around the valve seat 14 and the head of the valve 16.

Reciprocable in the bore 40 is an annular piston 46 sealed by an O-ring 48. The piston 46 is provided on its outer end with central valve-seating means 50 engageable with the outer side of the head of the valve 16 to hold same on its seat 14, as will be described. Preferably, the valve-seating means 50 comprises simply an annular rib 52 provided with radial notches 54 to permit developing a vacuum between the piston 46 and the flat surface 22 when the rib 52 is seated on the outer end of the valve head.

The piston 46 is provided with an axial, tubular stem 56 axially slidable in a bore 58 smaller than the piston bore 40. The stem 56 is sealed by an O-ring 60, and withdrawal of the piston 46 and the stem 56 from their respective bores is prevented by a snap ring 62 on the stem 56. The space between the two O-rings 48 and 60 is vented to the atmosphere by a vent passage 64 through the bore end 34 of the housing 32 to permit axial movement of the piston. It will be noted that the annular piston 46 and the tubular stem 56 provide an axial vacuum passage 66 which extends all the way through the stem and the piston and which communicates at its lower end with the radial notches 54 in the valve-seating rib 52.

The housing 32 is provided with an axial vacuum passage 68 therethrough having a lower end in communication with the upper end of the axial vacuum passage 66 through the piston 46 and stem 56. The lower end 34 of the housing 32 is provided with a radial vacuum connection 70 communicating with the lower end of the axial vacuum passage 68, and having connected thereto a vacuum line 72 leading to a suitable vacuum source, such as a vacuum pump, not shown.

Radially opposite the vacuum connection 70 is a vacuum releasing means 74 including a check valve 76 which is manually depressible in the radially inward direction to release any vacuum within the device 30.

The housing 32 is provided in its upper end 36 with a cavity 78 open to the exterior of the housing and communicating with the upper end of the axial vacuum passage 68 in the housing. Disposed in the cavity 78 is a vacuum gage 80 sealed with respect to the housing by an O-ring 82 encircling a portion of the gage. The vacuum gage 80 communicates with the axial vacuum passage 68 in the housing 32.

Operation of testing device 30

Prior to using the testing device 30, it is merely necessary to insert the valve stem 18 into its guide 20 until the head of the valve 16 is in engagement with its seat 14. The testing device 30 is then placed in the position shown in FIG. 1, with the annular seal 44 in engagement with the surface 22 around the valve seat 14 and the head of the valve 16.

Through the vacuum line 72 and the vacuum connection 70, a vacuum is then developed in the outer end of the piston bore 40, by way of the axial vacuum passages 68 and 66. The result is movement of the piston 46 in a direction to bring the valve-seating rib 52 into engagement with the outer side of the head of the valve 16, the vent passage 64 permitting such piston movement. The radial notches 54 in the valve-seating rib 52 permit continuing the development of the vacuum.

It will be noted that the vacuum developed between the outer end of the piston 46 and the flat surface 22 causes the valve-seating rib 52 to engage the outer side of the head of the valve 16 to urge the valve head into positive engagement with its seat 14. Also, this same vacuum acts on the testing device 30 as a whole to hold it in place relative to the block or head 10, with the seal 44 firmly in engagement with the flat surface 22. Thus, it is unnecessary to provide any additional means, such as a valve spring, to seat the valve 16, nor is it necessary to provide any additional means to secure the testing device 30 to the block or head 10.

The vacuum developed in the foregoing manner is measured and indicated by the gage 80. In general, if a vacuum of eighteen to twenty inches of mercury can be developed, the seal between the head of the valve 16 and the valve seat 14 is satisfactory. If such a vacuum cannot be developed, then grinding or regrinding of the valve 16 and the valve seat 14 and/or replacement of the valve, if defective, is necessary.

Description of testing device 130, FIGS. 3 and 4

Referring to FIGS. 3 and 4 of the drawing, illustrated therein is an engine component 110, such as a head, having an intake or exhaust port 112 and a corresponding valve seat 114. Seated on the latter is the head of a poppet-type intake or exhaust valve 116 having the usual steam 118 reciprocable in a guide 120. In this case, the engine component 110 is so shaped that the vacuum valve testing device 30 cannot be used, any flat area adjacent the valve seat 114 being inaccessible to, and/or too small to accommodate, the testing device 30. Therefore, in this case, a flat surface 122 of the engine component 110 around the periphery of the intake or exhaust port 112 is used to accommodate a testing device 130 of the invention.

The testing device 130 comprises a housing 132 having an enlarged end 134 provided with a flat surface 136 carrying a large-area seal means 138 engageable in airtight relation with the flat surface 122 around the port 112. As shown in FIG. 4, the enlarged end 134 of the housing 132 may be rectangular, and the seal means 138 may comprise a similarly-shaped piece of elastomeric material.

A vacuum passage 40 extends entirely through the housing 132, and through the flat surface 136 thereof, being provided at its opposite end with a vacuum connection 142 similar to the vacuum connection 70 of the testing device 30. The seal means 138 is provided with a vacuum port 144 communicating with the passage 140. The portion of the housing 132 adjacent the vacuum connection 142 may be cylindrical to provide a handle.

The enlarged end 134 of the housing 132 is provided in one side thereof with a cavity 148 having an open outer end. The inner end of the cavity communicates with a transverse vacuum passage 150 connected to the vacuum passage 140.

A vacuum gage 152 similar to the vacuum gage 80 is disposed in the cavity 148 and sealed relative to the housing 132 by an O-ring 154.

Operation of testing device 130

After the valve stem 118 has been inserted into the guide 120 sufficiently to engage the head of the valve 116 with its seat 114, the seal means 138 of the testing device 130 is seated against the flat surface 122 around the port 112, and a vacuum is developed by way of the vacuum connection 142. This results in developing a vacuum on the stem side of the head of the valve 116, which vacuum causes the head of the valve to seat. At the same time, the vacuum holds the testing device 130 in place against the flat surface 122 of the engine component 110. The vacuum achieved is measured and indicated by the gage 152. Because of the fact that there is some leakage along the valve stem 118, a vacuum reading of the order of sixteen inches of mercury will indicate a satisfactory seal between the head of the valve 116 and its seat 114.

Conclusion

It will thus be apparent that both the testing device 30 and the testing device 130 achieve vacuum testing of a poppet-type valve without any necessity for completely installing the valve. More particularly, both devices have means for applying a vacuum to one side of the head of the valve to test the seal between the valve and its seat, and both utilize this same vacuum to seat the valve and to seat the device itself. Consequently, with either device, the test may be performed very quickly and easily, which is an important feature of the invention.

Although exemplary embodiments of the invention have been disclosed for purposes of illustration, it will be understood that various changes, modifications, and substitutions may be incorporated in such embodiments.

I claim as my invention:

1. In a device for vacuum testing the seal between the head of an intake or exhaust valve of an internal combustion engine and its seat, the engine having a flat surface adjacent and encompassing the seat and the head of the valve, the combination of:
   (a) an elongated housing provided at one end with a bore therein having an open end encircled by a rim of a diameter to encircle the seat and the head of the valve;
   (b) an annular seal carried by said rim and engageable with the flat surface around the seat and the head of the valve;
   (c) a piston reciprocable in said bore and having on its outer end central valve-seating means engageable with the head of the valve to hold same on the seat;
   (d) means for developing a vacuum in said open end of said bore adjacent said outer end of said piston when said annular seal on said rim is seated on the flat surface around the head of the valve and the seat;
   (e) said vacuum developing means comprising an external vacuum connection on said housing and an axial vacuum passage through said piston extending from said vacuum connection to said outer end of said piston;
   (f) said housing being provided with an axial vacuum passage in communication with said external vacuum connection and in communication and alignment with said axial vacuum passage through said piston; and
   (g) vacuum measuring means carried by said housing at the other end thereof and communicating with said axial vacuum passage in said housing.

2. A vacuum valve testing device as defined in claim 1 wherein said other end of said housing is enlarged and is provided with a recess containing said vacuum measuring means.

References Cited

UNITED STATES PATENTS 2,823,542  2/1958  Walraven et al. _____ 73—47UX

OTHER REFERENCES 391,218  4/1933  Great Britain _____ 73—47

LOUIS R. PRINCE, Primary Examiner

W. A. HENRY II, Assistant Examiner

U.S. Cl. X.R.

73—119